Dec. 15, 1953 H. L. LESIGNE 2,662,935

REGISTER SYSTEM FOR RECEIVING SEVERAL CODES

Filed April 8, 1949 2 Sheets-Sheet 1

INVENTOR
HENRI LOUIS LESIGNE
BY
Adams & Bush
ATTORNEYS

Dec. 15, 1953 H. L. LESIGNE 2,662,935

REGISTER SYSTEM FOR RECEIVING SEVERAL CODES

Filed April 8, 1949 2 Sheets-Sheet 2

INVENTOR
HENRI LOUIS LESIGNE

BY
Adams & Bush
ATTORNEYS

Patented Dec. 15, 1953

2,662,935

UNITED STATES PATENT OFFICE 2,662,935

REGISTER SYSTEM FOR RECEIVING SEVERAL CODES

Henri Louis Lesigne, Vanves, France, assignor to Compagnie Industrielle des Telephones Application April 8, 1949, Serial No. 86,303

1 Claim. (Cl. 179—18)

Figure 1:
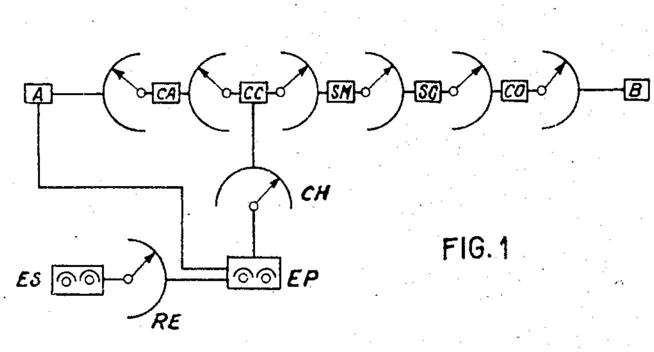

All switching systems utilised in the communication art comprise means enabling a calling subscriber to have the exchange with which he is connected know the call number of the correspondent with whom he desires to be connected. In automatic systems these means usually comprise a member called a dial, located at the subscriber's substation and enabling him to compose the different digits utilised for transmitting the desired number.

The operation of the dial produces a series of openings of the line loop, the number of which is equal to the value of the digit.

The transmission cadence of such impulses has been chosen equal to 10 impulses per second.

On the other hand the separation of the series of impulses corresponding to two successive digits requires a time interval generally chosen equal to 300 milliseconds.

The transmission of a digit by this process can therefore have no uniform duration. This duration ranges from 400 milliseconds for digit 1 to 1,300 milliseconds for digit 0, which comprises 10 impulses.

It may be assumed that the average duration is that for transmitting digit 5, namely 800 milliseconds. This duration is not negligible, and in order to lower it it has been proposed to substitute for the conventional code which has just been mentioned other codes for transmitting digits. These codes are applicable where a subscriber calls a correspondent connected with an exchange other than his own, or the subscriber has at his disposal means for transmitting signals according to codes other than the conventional one.

It is then necessary to provide in each exchange devices specially designed for receiving numbering signals in accordance with such codes.

Up to the present time, where several different codes were utilised in the operation of a network several register groups were utilised, each of which could receive the signals of one code only. This solution is expensive, firstly because it necessitates registers of different types, secondly because these registers are inefficiently utilised.

In the system according to this invention an exchange connected with lines on which numbering signals may be sent according to different codes comprises registers adapted to receive directly calls sent according to one code and at least one register that may be temporarily connected with one of the first mentioned registers and adapted to receive numbering signals sent in another code and to control, in accordance with these signals, the operation of the register with which it is temporarily connected.

The main register comprises a discrimination circuit, by which the calls are received and which is capable of distinguishing the category of the calling line and therefore the code according to which the number of the called subscriber will be transmitted on this line. The main register is thus informed of the code utilised. If this code is not that for which it is designed, it brings into its circuit that auxiliary register which is specially desgned for this code.

This auxiliary register receives the numbering signals and controls the registering of the called number by the main register. The main register then controls the setting up of the communication in the normal way.

Figure 2:
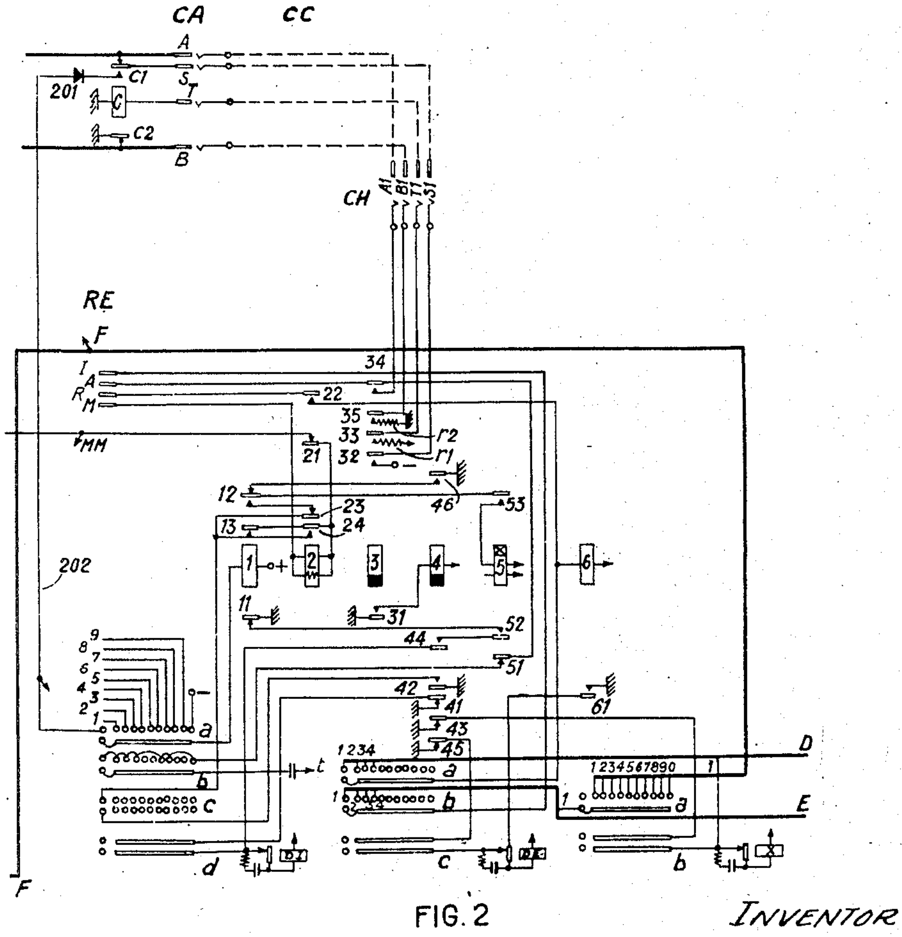
Figure 3:
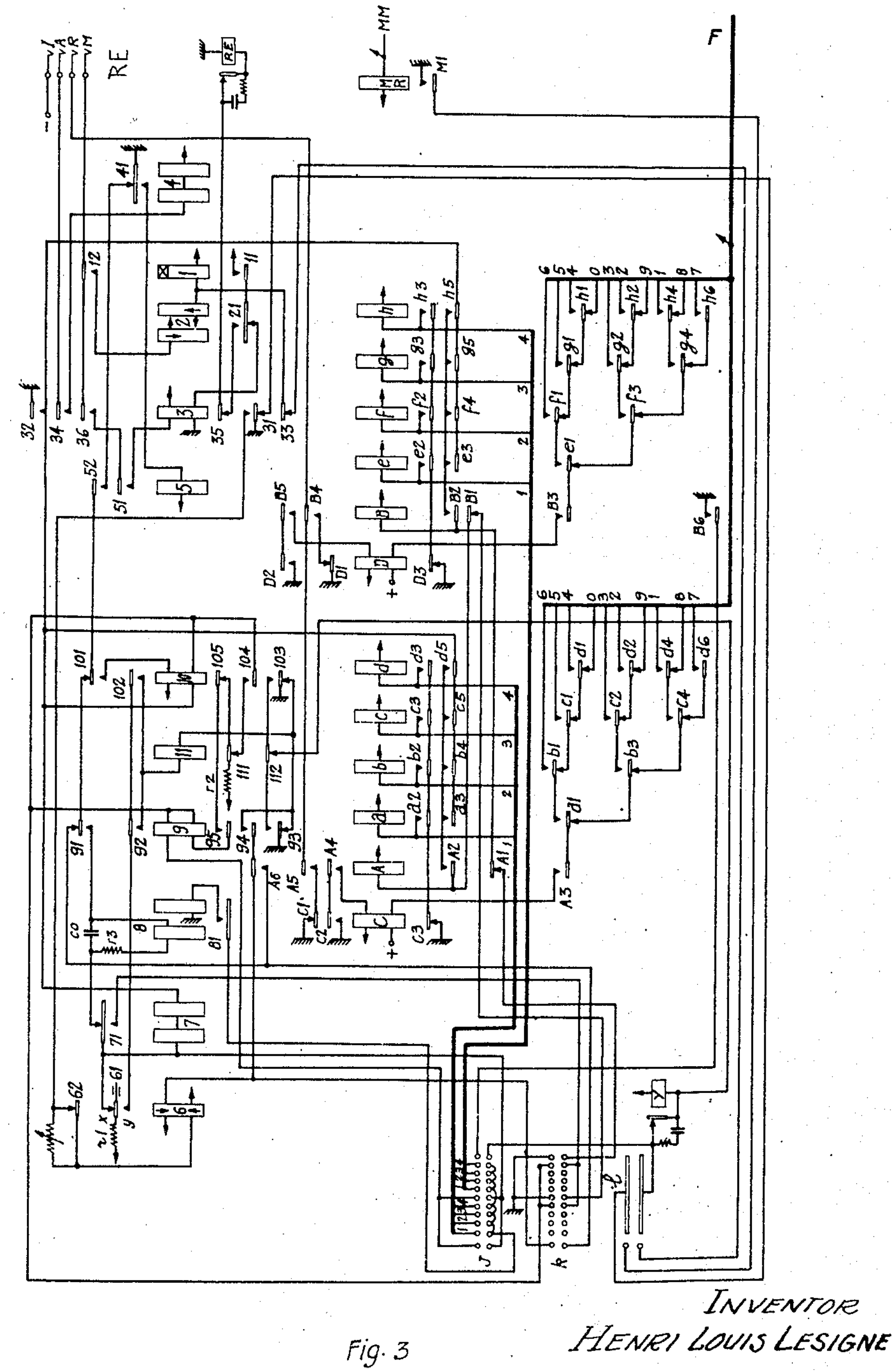

The invention will be more easily understood with the help of the three accompanying figures. Fig. 1 is a general diagram of the devices utilised for setting up a connection, Fig. 2 shows some circuits of the main register and Fig. 3 is the diagram of an auxiliary register.

In Fig. 1, A designates a calling subscriber and B a called subscriber. The connection between A and B takes place through a call finder CA, a link circuit CC, a thousands selector SM, a hundreds selector SC and a connector CO.

The link circuit CC is connected with a main register EP through a link finder CH.

On the other hand, if the numbering code utilised by the subscriber A is not that which EP can directly receive, the latter may be supplemented, through a finder RE, by an auxiliary register ES.

In Figure 2, C designates the calling subscriber's line equipment relay, the subscriber's station, which is not shown, being connected with the contacts A, B of the call finder CA. The link circuit CC, whose operation plays no part in this invention, has not been shown, and has only been represented by connections in broken lines. CH designates the link finder co-operating with the register EP and enabling it to reach the call finder CA through the link circuit CC. This finder CH comprises a number of brushes, but four of them only play a part in the operation of the system according to the invention and have been represented. RE designates the finder connecting the main register with the auxiliary register. The bank contacts of this finder are represented in Fig. 2 by the letters I, A, R, M, and its brushes by the same letters in Fig. 3.

The different parts, shown in Fig. 2, of the main register are:

An eleven-position rotary switch, whose electro-magnet is designated by DI and which allows of discriminating the category of the calling subscriber. Wires coming from the several equipments of subscribers' lines terminate at the contacts 1 to 9 of the bank *a* of this rotary switch, all the equipments of the subscribers being provided with the same code being connected with the same contacts.

An eleven-position rotary switch, the incoming distributor whose control electro-magnet is designated by DE and which is adapted, as the digits are received, to connect up the numerical elements of the register which correspond to these digits.

The numerical elements proper, one of which only has been represented, constituted by an eleven-position rotary switch, the driving electro-magnet of which is designated by X and which is adapted to mark the control wires for the purpose of controlling the selectors.

A relay 1 intended to stop the discrimination rotary switch DI;

A relay 2 whose condition indicates whether the auxiliary register is connected with the main register;

A relay 3 for holding the main register;

An auxiliary holding relay 4;

A relay 5 for starting the register;

A relay 6 controlling the progress of the incoming distributor DE.

The operation of the system will now be described.

It is assumed that the setting up of the connection has reached the following stage: a call has taken place, the main register has been actuated and connected with the calling subscriber through the subscriber's line equipment relay C and the link finder CH.

It is assumed that the relay 5 has been operated at the moment of starting of the main register and that the relay 3, and therefore the relay 4, have been operated as soon as the calling subscriber has been connected with the main register.

The energization of the relay 4 then causes the rotation of the rotary switch DI through the following circuit: ground, 11, 52, 44, circuit breaker of DI, electro-magnet of DI and battery.

The line equipment relay C is energized through: ground, relay C, contact and brush T, contact and brush $T_1$, 33, resistance $r_1$ and battery. When DI reaches the position corresponding to this line the relay 1 is energized through the following circuit: positive terminal, relay 1, zero position of the bank *a* of the rotary switch DI, discrimination wire 202, rectifying cell 201, front contact C1 of the subscriber's relay C, contact and brush S of CA, contact and brush S1 of CH, 32 and negative terminal.

By its operation, the relay 1 breaks at 11 the rotation circuit of DI.

The starting of the specialized auxiliary register ES (Figs. 1 and 3) corresponding to the code of the calling line, is effected through: ground, 42, zero position of the bank *c* of DI, 13, 21, wire MM, which is connected with a starting device, not shown in Fig. 2. The relay 5 is still maintained through: battery, holding winding of 5, 53, 12, 23, zero position of the bank *c* of DI, 42 and ground.

The cable F of Fig. 2 is connected with the cable F of Fig. 3.

Fig. 3 shows an auxiliary register. It comprises the following parts:

The brushes and the driving electro-magnet of the rotary switch RE designed to find the calling main register;

A starting relay MR;

A relay 4 receiving the impulses sent by the subscriber's keyboard;

A relay 1 for starting the finder RE;

A test relay 2;

A relay 3 providing for the connection with the main register;

A holding relay 5;

A vibrating relay 6 whose constitution and operation will be described later;

A timing relay 7;

A marking relay 8;

A relay 9 for holding the vibrating relay;

A relay 11 for controlling the progress of the rotary switch Y which will be defined hereinafter;

A cycle closing relay 10;

Stopping relays C and D for the numerical elements of the main register;

Rotating relays A and B;

Two groups of marking relays: *a*, *b*, *c*, *d*, and *e*, *f*, *g*, *h*.

An eleven-position rotary switch whose electro-magnet is designated by Y and which is designed to up the marking relays.

The starting circuit which is situated in the main register and has been described above is connected by the wire MM with the auxiliary register and provides for the energization of the starting relay MR of this register.

The energization of this relay causes the finder RE to search for the main register by which it has been energized, through the following circuit: ground, M1, zero position of the bank 1 of the rotary switch Y, 33, relay 1 and battery on one hand, relay 2 and battery on the other hand. The rotation of RE is obtained through ground, electro-magnet RE, 35, 21 in its front position, 11 and battery. When the register finder RE finds on the contact M the polarity corresponding to a calling register, the rotation stops owing to the release of the differential relay 2 through the following circuit: battery, winding of the relay 2, 12, brush M of the register finder RE, then (Figure 2) contact stud M, windings of the relay 2, 13, zero position of the bank *c* of DI, 42 and ground.

The rotation of the register finder RE is then stopped at 21. (Fig. 3.)

The release of the relay 2 (Fig. 3) energizes the relay 3 through: ground, relay 3, 21, 11 and battery.

The relay 3 opens, by its contact 33, the starting circuit, but, as the relay 1 is delayed it energizes, before it is released, the relay 4 through the following circuit: battery, relay 4, 34, brush A of the finder of RE, then (Fig. 2), contact A of RE, 34, brush and contact $A_1$ of CH, brush and contact A of CA, subscriber's loop, not shown, contact and brush B of CA, contact and brush $B_1$ of CH, 35, resistance $r_2$ and ground. The energization of relay 4 (Fig. 3) entails that of 5 through: battery, relay 5, 41 and ground. Relay 3 can therefore be maintained on wire M through 51 and it energizes relay 2 of Fig. 2 through the following circuit: battery (Fig. 3), winding of 3, 51, 36, brush M of RE, then (Fig. 2) contact stud M of RE, winding of 2, 13, zero position of bank *c* of DE, 42 and ground. Relay 2 of Fig. 2 is maintained by its contact 24 on the circuit above described and opens at 21 the starting circuit; it also opens at 23 the holding circuit of relay 5.

The secondary register is then connected with the main register and ready to receive the numbering signals sent by the calling subscriber.

The dial tone is then sent to him through: wire *t* (Fig. 2), bank *b* of the rotary switch DI, 51, 34, brush and contact $A_1$ of CH, brush and contact A of CA, subscriber's loop, not shown, contact and brush B of CA, contact and brush $B_1$ of CH, 35, resistance $r_2$ and ground.

The energization of relay 3 of Fig. 3 entails through ground, 31, lower winding of 6 and battery, the excitation of the vibrating relay 6, a device comprising a vibrating plate 6, closing every 50 milliseconds alternately the contacts $x$ and $y$. The operation and adjustment of this device are such that, when only the lower winding is energized, contact $y$ is closed. Flow of current through the upper winding, mounted differentially, brings about the release and allows the plate freely to oscillate. However, the delay is such that the contact $x$ is closed for the first time only 25 milliseconds after the current has been caused to pass through the upper winding.

It is assumed that the numbering signals sent by the subscriber are of the "start-stop" type with four periods of 50 milliseconds each, and are distinguished from each other by the emission or the absence of current. In rest condition, current flows through the line and the "start" corresponds to an interruption of 50 milliseconds. To the different digits sent by the keyboard correspond the combinations mentioned in the following table, in which X designates an absence and O an emission of current.

| Digit sent | Start 50 ms. | Periods | | | | Stop 50 ms. |
|---|---|---|---|---|---|---|
| | | 1 50 ms. | 2 50 ms. | 3 50 ms. | 4 50 ms. | |
| 1 | X | O | O | X | X | O |
| 2 | X | O | X | O | X | O |
| 3 | X | O | X | X | O | O |
| 4 | X | X | O | O | X | O |
| 5 | X | X | O | X | O | O |
| 6 | X | X | X | O | O | O |
| 7 | X | O | O | O | X | O |
| 8 | X | O | O | X | O | O |
| 9 | X | O | X | O | O | O |
| 0 | X | X | O | O | O | O |

Depending on the composition of the signal sent one or more relays of the *a*, *b*, *c*, *d* or the *e*, *f*, *g*, *h*, group of Fig. 3 are energized. If an emission of current corresponds to a given period, the corresponding relay is not energized. Relays *a* and *e*, *b* and *f*, *c* and *g*, *d* and *h* correspond to the first, second, third and fourth period respectively.

The emission of a digit by the subscriber therefore gives rise to a pulse train, which will be repeated by relay 4 (Fig. 3). Relay 5 is slow to release and will not be released while 4 is operating.

As soon as the "start" is received relay 4 is released. The vibrating relay 6 unlocks the vibrating plate 61 through the following circuit: ground, 41, 52, 101, 91, zero position of the bank *k* of Y, upper winding of 6 and battery. The vibrating plate 61 then establishes the $x$ contact with a 25 milliseconds' delay, and the relay 9 is energized through: battery, resistance $r_1$, contact $x$ of 61, zero position of the blank *j* of Y, upper winding of 9, lower winding of 10, which does not operate, 32 and ground. The relay 9 is held through: ground, 32, winding of 10, lower winding of 9, 95, 105, resistance $r_2$ and battery.

The rotary switch Y is energized through battery, electro-magnet Y, 112, 93 and ground. When the vibrating plate 61 is in the $y$ position, it energizes relay 11 through battery, resistance $r_1$, contact $y$, 92, winding of 11, 103 and ground. The energizing circuit of Y is opened at 112, the electro-magnet is released and proceeds one step to position 1.

The upper winding of 6 is still in operation through battery, winding of 6, 94, 103 and ground.

The vibrating plate again reaches $x$ after such a time that its contact $x$ is closed in synchronism with the first period of the sent signal.

The opening of contact $y$ causes the release of relay 11, whereby the electro-magnet of Y is again energized.

When the contact $x$ is again closed, relay 7 is energized through battery, resistance $r_1$, contact $x$ of 61, winding of 7, 32 and ground. But this relay 7 has such an operating delay as to allow the charging of the condenser CO. If the first signal period corresponds to a current opening, the relay 4 is released and the condenser CO discharges through battery, resistance $r_1$, contact $x$, 71, condenser CO, 91, 101, 52, 41 and ground. The opening of contact 71 allows the discharge of condenser CO through the resistance $r_3$ and the energization winding of relay 8. The latter is maintained and energizes relay *a* through ground, winding of 8, 81, position 1 of the bank *j* of Y, wire 1, winding of *a* and battery; relay 8 is therefore maintained in series with relay *a*. When *a* has been energized it is maintained through battery, winding of *a*, $a_2$, $C_3$ and ground.

Relay 8 is short-circuited through $a_2$ and is released.

The plate 61 opens its contact $x$, which brings about the release of 7, and it closes its contact $y$. Relay 11 is then again energized through the above described circuit, and opens the circuit of the electro-magnet Y, which brings it to position 2. When the contact $y$ is opened, 11 is released, contact 112 again energizes Y, which again attracts its pawl.

The re-closing of contact $x$ gives rise to the same cycle. If the period during which contact $x$ is closed corresponds to an opening of the line, relay *b* is energized, is maintained, short-circuits 8 at $b_2$, and the former succession of steps is reproduced. This also applies to relays *c* and *d*, the rotary switch Y proceeding one step at each single period of one digit.

Rotary switch Y being in position 4, relay *d* is or is not energized depending on the nature of the signal sent, but the energization of relay 7 entails that of relay 10 through: battery, resistance $r_1$, contact $x$, 71, position 4 of the bank *k* of Y, lower winding of relay 10, 32 and ground. Relay 10 opens at 101 the charging circuit of the condenser, prepares its holding circuit through 101 and opens at 105 the holding circuit of relay 9, which is released. Relay 10 is temporarily maintained through: battery, resistance $r_2$, 111, 104, lower winding of 10, 32 and ground.

The release of relay 9 brings about the re-energization of the vibrating relay 6 through the opening of its upper winding, the lower winding remaining energized. The closing of contact $y$ entails the energization of relay 11 through: battery, resistance $r_1$, contact $y$, 102, relay 11, 93 and ground. The circuit of the electro-magnet Y is opened at 112 and the rotary switch reaches the position 5.

The sending of the digit is then over. As the stop signal always corresponds to an emission of current, relay 4 is re-energized as soon as this stop signal is received, and relay 13, which was maintained by its upper winding when its fourth period corresponded to an opening, is released when contact 111 is opened.

The system is then ready to receive a second digit.

Relay A is energized through: battery, relay A, $B_1$, position 5 of the bank *k* of Y, and ground. It is maintained through A2, some of the contacts $a_3$, $b_4$, $c_5$ and $d_5$, 32 and ground.

If another digit is then sent by the subscriber, it will be received by the group of relays *e*, *f*, *g* and *h*, and the vibrating relay will be capable of being unlocked through: battery, upper winding of 6, A6, 91, 101, 52, 41 and ground.

The operation of the system will be absolutely the same as when the first digit is received with the sole difference that the switch will successively reach the positions 6, 7, 8 and 9 and the receiving relays will be *e*, *f*, *g*, and *h*.

The orientation of the numerical elements by the main register takes place as follows:

Let it for instance be assumed that the digit sent is 5: the first period of the signal after the start corresponds to a current opening, the second to a current emission, the third to an opening, the fourth to an emission. According to the above described manner of operation, relays *a* and *c* are energized, whereas *b* and *d* are not, after the signal has been received. The 10 transfer wires of group F are connected with the bank of the numerical elements of the main register, that is, on the contacts of the bank *a* of the rotary switch X (Fig. 2).

The numerical element is positioned as follows:

The rotating electro-magnet of X is energized through: battery (Fig. 2), electro-magnet and circuit breaker of X, wire 1 of cable D, zero position of the bank *a* of DE, 22, contact R of RE, then (Fig. 3), brush R, A5, $C_1$ and ground. At the same time relay 6 (Fig. 2) is energized through the same circuit.

The rotary switch of DE is energized through: battery, electro-magnet DE, 61 and ground. It will proceed one step when its rotation circuit is opened through the release of 6, and will thus allow the rotation of a second numerical element through the circuit: bank *a*, position 2, wire 2.

If the above example is again referred to, it will be noted that, when the rotary switch X reaches the position corresponding to the wire of the group F which bears number 5, the following circuit is established: positive pole of an insulated battery (Fig. 3) being part of the auxiliary register, lower winding of relay C, A3, *a1*, *b1*, *c1*, wire 5 of group F (Fig. 3) then (Fig. 2) wire 5, bank *a* of X, wire 1 ending at the corresponding position of the bank *b* of DE, bank *b*; contact I and (Fig. 3) brush I and negative pole of the insulated battery of the auxiliary register. Relay C (Fig. 3) is energized and is maintained through: battery, upper winding of C, A4, C2 and ground. The rotation circuit is opened at C1 and the rotary switch X stops on the position corresponding to wire 5. Relay 6 (Fig. 2) releases and causes DE to proceed one step. The holding circuit of relays *a* and *c* (in the example chosen) is opened by contact C3 of relay C (Fig. 3). When relays *a* and *c* are released, the holding circuit of relay A is opened, A is released, thus enabling the sending of the second digit which it had been possible to receive on relays *e*, *f*, *g* and *h* during the positioning of the first numerical element X of the main register. There are as many numerical elements X as digits to be registered, these elements being inserted into the circuit by DE when the digits registered in coded signals are being repeated.

I claim:

In a system for the reception of coded signals in telecommunication: a main register comprising a marking switch having a first row of terminals, a second row of strapped terminals in front of said first row and a wiper hunting over said two rows; a plurality of calling subscribers' two-wire lines; means responsive to a call made over any of said lines for connecting said main register to the two wires of the calling line; an auxiliary register comprising two battery terminals, means responsive to the reception of a train of coded impulses and a stopping relay having a back contact; means responsive to a call made over at least one of said lines for connecting said auxiliary register to said main register; and for subsequently connecting through said main register one wire of said line to said means responsive to the reception of a train of coded impulses; an energizing circuit passing over said back contact of said stopping relay for bringing about the hunting by said wiper of said marking switch after the reception of each train of impulses; a plurality of wires each of which has one of its extremities connected to one different terminal of said first row of terminals of said marking switch; means for connecting to one of said battery terminals of said auxiliary register over said stopping relay the other extremity of one or the other of said wires depending on the received combination of coded impulses; and a connection between said second row of strapped terminals of said marking switch and the other battery terminal.

HENRI LOUIS LESIGNE.

References Cited in the file of this patent

UNITED STATES PATENTS

| Number | Name | Date |
|---|---|---|
| 1,482,618 | Polinkowsky | Feb. 5, 1924 |
| 1,589,402 | Kopp | June 22, 1926 |
| 1,708,949 | Mathies | Apr. 16, 1929 |
| 1,855,727 | Ostline | Apr. 26, 1932 |